United States Patent [19]

Mordarski et al.

[11] Patent Number: 4,723,578

[45] Date of Patent: Feb. 9, 1988

[54] STEAM GENERATOR TUBE REPAIR METHOD AND ASSEMBLY

[75] Inventors: Walter J. Mordarski, Wallingford; Sylvester T. Zegler, Simsbury, both of Conn.

[73] Assignee: Combustion Engineering, Inc., Windsor, Conn.

[21] Appl. No.: 748,318

[22] Filed: Jun. 24, 1985

[51] Int. Cl.$^4$ .............................................. F16L 55/10
[52] U.S. Cl. ........................................ 138/97; 138/89; 29/447
[58] Field of Search ..................... 138/89, 90, 97; 220/233, 235, 237; 174/DIG. 8; 285/381, 144, 145; 29/447; 441/55, 44, 45, 72; 73/49.1, 49.5; 165/71, 76

[56] References Cited

U.S. PATENT DOCUMENTS

| | | | |
|---|---|---|---|
| 1,644,118 | 10/1927 | Florence | 138/90 |
| 2,062,519 | 12/1936 | Ljungberg | 138/90 |
| 2,870,794 | 1/1959 | Thaxton | 138/90 |
| 3,886,977 | 6/1975 | Dorgebray | 138/89 |
| 3,900,939 | 8/1975 | Greacen | 29/447 |
| 4,091,841 | 5/1978 | Beneker et al. | 138/97 |
| 4,114,654 | 9/1978 | Richardson | 138/89 |
| 4,281,841 | 8/1981 | Kim et al. | 29/447 |
| 4,282,982 | 8/1981 | Nvesslein | 138/89 |
| 4,350,183 | 9/1982 | Holmes | 138/89 |
| 4,381,800 | 5/1983 | Leslie | 138/90 |
| 4,436,117 | 3/1984 | Martin | 138/89 |
| 4,469,357 | 9/1984 | Martin | 138/89 |
| 4,501,058 | 2/1985 | Schutzler | 29/447 |
| 4,513,786 | 4/1985 | Sodergren | 138/89 |

OTHER PUBLICATIONS

"Polytechnic Cable", article (Polytechnic Institute of New York), Nov. 1979, p. 1.

Primary Examiner—Stephen Marcus
Assistant Examiner—Leo Peters
Attorney, Agent, or Firm—Chilton, Alix & Van Kirk

[57] ABSTRACT

A steam generator tube repair assembly employs a stud having a shaft and a head which forms a transverse sealing surface. A driver wedge has a central axial bore for receiving the shaft and a generally frustoconical exterior surface for receiving a sealing sleeve. The sealing sleeve has a circumferentially extending sealing surface and an end surface which is adapted for sealing engagement with the sealing surface of the stud head. A coupling nut is tightened to force the driver wedge to swage the sealing sleeve for radial sealing engagement and also transverse sealing engagement. The driver wedge and or the sealing sleeve are formed of shape memory materials so that at a temperature below a transition temperature the diametral dimensions of the sealing sleeve are reduced and at a temperature above the transition temperature the diametral dimensions of the sealing sleeve are expanded into sealing engagement with the tube.

10 Claims, 1 Drawing Figure

U.S. Patent  Feb. 9, 1988  4,723,578
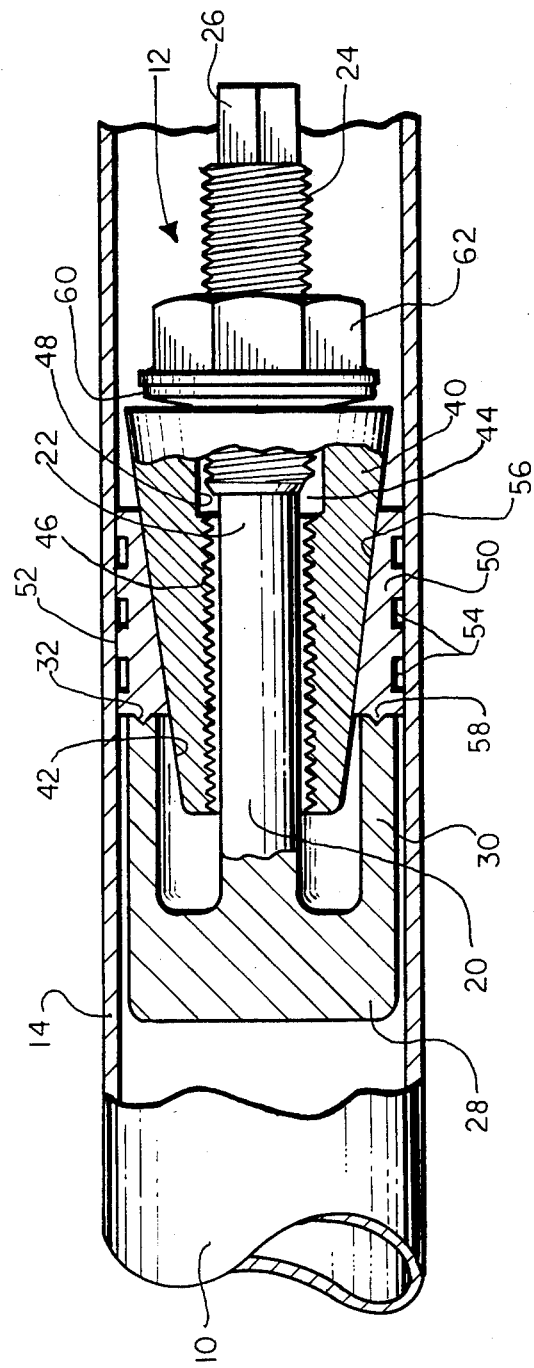

STEAM GENERATOR TUBE REPAIR METHOD AND ASSEMBLY

BACKGROUND OF THE INVENTION (1) Technical Field of the Invention

This invention relates generally to the repair of tubes. In particular, this invention is directed to methods of and apparatus for use in the repair of tubes in a heat exchanger such as, for example, a nuclear steam generator.

Steam generators are large heat exchangers which are commonly employed in electric power generating installations. In the operation of nuclear power reactors, a steam generator is interposed between the nuclear reactor vessel and the turbine generator set. Hot water from the nuclear reactor is passed through the tubes of the steam generator for generating steam on the shell or secondary side of the generator.

Steam generators typically contain thousands of tubes. Leakage in some of the tubes due to corrosion or mechanical failure is a common problem in steam generators. In fossil fuel plants some degree of leakage can be tolerated. However, in nuclear plants even minor leakage can provide a path for the transfer of radioactive contamination to other components of the power plant system. Thus, measures must be taken during the periodic plant outages to repair the leaking tubes.

All steam generators are designed with excess thermal exchange capacity. Conventional tube repair is generally approached by either plugging a tube to remove the tube from service or by securing a sleeve in the tube to enable the primary fluid to by-pass the deteriorated portion of the tube. The excess thermal exchange capacity which has been specially incorporated into the steam generator allows a fraction of the tubes to be sealed off without compromising the overall effectiveness of the exchanger.

In nuclear plants radioactive contamination of the steam generator by carry-over from the reactor fuel system limits the time that repair personnel may spend in the steam generator enclosure where the repair work is to be performed. The environmental exposure constraints imposed on workmen entering a radioactive steam generator tend to mitigate against conventional repair methods and repair assemblies which require welding, brazing and other time intensive tasks. Moreover, in previously employed tube repair methods and assemblies which provide for efficient tube repair, the removal of welded assemblies and known plug assemblies have proven problematical and expensive.

It is accordingly a principal aim of the present invention to provide a new and improved steam generator tube repair assembly which overcomes many of the noted deficiencies of conventional tube repair methods and hardware.

(2) Description of the Prior Art

U.S. Pat. No. 3,900,939 discloses a method for plugging the ends of defective tubes of heat exchangers. The patented method employs a plug fabricated from a metallic alloy having a mechanical memory characteristic whereby the plug can be physically deformed into a reduced diameter for insertion into the tube end and thereafter induced to assume its original diameter to secure the plug within the tube. U.S. patent application Ser. No. 542,307 filed Oct. 14, 1983, now abandoned and assigned to the assignee of the present invention discloses a tube repair insert for securing a repair assembly in position within a tube. The repair assembly includes a cylindrical shell having an outer diameter substantially equal to the tube inner diameter. The repair assembly also includes a alloy ring having a shape memory and an outer diameter substantially equal to the shell inner diameter. The shape memory ring has a temperature threshold below the ambient tube operating temperature. The shape memory ring is maintained in the contracted condition during insertion of the ring within the shell. A leak-tight joint is formed between the expanding shell and the tube at the repair assembly location when the alloy ring reaches the threshold temperature. The alloy ring expands typically on the order of 3-5 percent.

U.S. Pat. No. 4,469,357 discloses a composite coupling device comprising two members. The first member is a heat recoverable driving member and the second is a metallic member associated with the first member in a manner wherein upon heat recovery of the driver, the second member is dimensionally transformed for engaging a cylindrical substrate. The driving member comprises a tubular heat recoverable compression sleeve having a generally uniform interior surface. The second member comprises a tubular insert snugly and concentrically disposed within the compression sleeve. Upon heat recovery of the compression sleeve the insert is compressed about the substrate. The driving member may also be positioned internally of the second member so that expansive heat recovery of the driving member expands the second member to engage the substrate.

U.S. Pat. No. 3,525,365 discloses an expansion plug for sealing passages comprising an expanding plug member and a locking member having complementary frustoconical surfaces which cooperate to provide a sealing engagement upon outward expansion of the plug.

BRIEF SUMMARY OF THE INVENTION

Briefly stated, the invention in a preferred form is an assembly and a method for plugging a tube. The assembly comprises a "stud" having a shaft with a threaded portion and a head which defines an annular transverse sealing surface. The assembly also comprises a driver wedge having a central axial bore which is at least partially defined by a threaded surface which is adapted for threading engagement with the stub shaft threaded portion. The driver wedge has a generally frustoconical exterior surface. The assembly further includes a sealing sleeve having an interior frustoconical surface which is complementary to the wedge frustoconical surface. The sealing sleeve exteriorly forms a circumferentially extending sealing surface with an end of the sleeve being adapted for sealing engagement with the sealing surface of the head of the stud. A coupling nut is threadably engageable with the stud threaded surface so that, upon mounting the sleeve on the driver wedge and receiving the shaft in the axial bore, the coupling assembly may be caused to forceably engage the driver wedge to deform the sealing sleeve to thereby cause radial sealing engagement between the sleeve and the inside of the tube and axial (transverse) sealing engagement with the stud head sealing surface.

The driver wedge or the sealing sleeve or both the wedge and sealing sleeve are formed of a shape memory material wherein the diametral dimensions expand when the temperature of the members exceeds a transition temperature. The head of the stud is preferably configured to form a skirt generally symmetric about the stud shaft with the end surface of the skirt being the transverse sealing surface. The stud shaft threaded surface has an outside diameter which exceeds the inside diameter of an intermediate shaft portion which is disposed between the stud head and the shaft threaded surface. The axial bore of the wedge is configured and dimensioned so that in a first axial position the wedge threadably engages the shaft, and in a second axial position the wedge disingages from the shaft with the shaft extending through the bore. As described below, the first position, in which the wedge threadably engages the shaft, is utilized for disengaging the wedge relative to the sealing sleeve during removal of the plug from the tube.

A method for removably plugging of a tube in accordance with the present invention comprises the step of providing a plug assembly comprising a sealing sleeve and a driver wedge respectively concentrically mounted on an axially extending stud, the stud having a head and a threaded surface for receiving a coupling nut. A portion of the plug assembly is formed of a material having a shape memory so that the diametral dimensions of the sealing sleeve may be reduced at a temperature below a transition temperature. The plug assembly is cooled to a temperature below the transition temperature. The cooled plug is inserted into the tube. The coupling nut is axially tightened to force the head of the stud and the sealing sleeve into generally axial sealing engagement and to deform the sealing sleeve into radial (circumferential) sealing engagement with the tube wall. The plug assembly is then heated above the transition temperature to radially expand the sealing sleeve to thereby compensate for elastic recovery of the sleeve when the driving force is removed from the nut. The plug assembly may be removed from the tube by cooling the plug assembly to a temperature below the transition temperature, threadably engaging the stud with the driver wedge, axially displacing the driver wedge relative to the sealing sleeve and axially pulling the plug assembly from the tube.

BRIEF DESCRIPTION OF THE DRAWING

The drawing comprises a side elevation view, partly in section and partly broken away, of a tube and a tube repair assembly in accordance with a first embodiment of the present invention.

DETAILED DESCRIPTION OF THE INVENTION

With reference to the drawing, a portion of a tube 10 of a nuclear steam generator is illustrated in conjunction with a mounted tube repair assembly designated generally by the numeral 12. Tube 10 may be one of a multiplicity of tubes formed of, for example, Inconel 600 material which serve as a fluid boundary between primary coolant from a nuclear reactor (not illustrated) and a secondary fluid to be converted into steam. Tube 10 is customarily welded at one end to a tube sheet (not illustrated). Typically an inlet plenum (not illustrated) below the tube sheet provides a region which is large enough for a workman to manipulate small equipment and/or appliances for servicing and repairing the tubes.

In order to repair a defect in the wall of a steam generator tube in accordance with the present invention, the steam generator is taken out of service and drained. A tube repair assembly 12 is inserted into opposing ends of the tube and secured in place thereby closing off or plugging the tube.

Tube repair assembly 12 comprises a stud 20 which includes an elongated central axially extending shaft 22. An externally threaded portion 24 having an enlarged outside diameter extends axially from one end of shaft 22. Threaded portion 24 terminates in a shank 26 having a rectangular cross-section. A head 28 extends from the opposite end of shaft 22 and is integral therewith. Head 28 includes a generally cylindrical exterior surface having an outer diameter which is slightly less than the inside diameter of the tube 10. Head 28 forms an outer skirt 30 which is generally concentric with shaft 22 and symmetrically disposed with respect to the central axis of the shaft, i.e., an annular recess about a portion of shaft 22 is defined by skirt 30. A circular sealing groove 32 is formed in the end of the skirt in symmetric relationship to the central axis of the shaft.

A driver wedge 40, having a generally frustoconical shape with an exterior surface 42, tapers from a minimum diameter at one end. The minimum diameter of wedge 40 is less than the outer diameter of the annular recess defined by skirt 30. The maximum diameter of wedge 40 is approximately equal to the outer diameter of the stud skirt. A stepped bore 44 extends axially through driver wedge 40. Bore 44 is defined by an internally threaded portion 46, which is complementary to the threaded portion 24 of the stud, and an enlarged bore 48 having a diameter which is greater than the maximum diameter of the threaded stud portion 24. As illustrated in the drawing, the foregoing dimensional relationships allow the driver wedge 40 to be mounted on the stud 20 with the shaft portion 22 being disposed within but out of contact with threaded surface 46 of wedge 40 and with the threaded portion 24 of the stud shaft in part accommodated in the enlarged bore 48 of the driver wedge.

A sealing sleeve 50 having an outside diameter in a first contracted state which is slightly less than the inside diameter of tube 10 defines a generally cylindrical circumferentially extending peripheral sealing surface 52. A plurality of circumferentially extending grooves 54 may be formed at the periphery of the sleeve for enhancing the sealing characteristics of the sleeve. Sealing sleeve 50 has an interior frustoconical surface 56 which is generally complementary to an axially intermediate portion of frustoconical surface 42 of the driver wedge. A forward end of the sealing sleeve includes a sealing rim 58 which is adapted for sealing engagement with the corresponding sealing groove 32 of the stud skirt 30.

A Belleville washer 60 is interposed between the end of the driver wedge 40 and a coupling nut 62 mounted on threaded portion 24 of the stud. As the coupling nut 62 is tightened against the washer 60, the skirt 30 of the stud is sealed against the forward end of the coupling sleeve by the interfitting reception of rim 58 in sealing groove 32. At the same time, the axial force applied to the driver wedge causes a radial force to be generated which deforms the sealing sleeve into sealing engagement with the interior wall 14 of the tube In accordance with the invention, the driver wedge 40 and/or the sealing sleeve 50 are formed of a material having pre-established shape memory properties. In one reduction to practice, either the sleeve or the driver wedge was formed of a Nitinol alloy consisting of 50 percent weight of nickel and a 50 percent weight of titanium, wherein when the member was heated above a threshold temperature, it expanded radially. The expansion was on the order of 8 percent. The change in the dimensions occurs as the alloy undergoes a change from a martensitic to an austenitic microstructure when the temperature increases above the transition temperature. The shape memory member or members may be constructed to change dimensions reversably each time the temperature transition point is traversed. Preferably, the threshold temperature is in the range of 0°–60° F. depending upon the particular application. An alloy transition temperature is pre-selected so that the transition temperature is slightly lower than the lowest operating temperature of the steam generator.

In one embodiment of the tube repair assembly, the diametral dimensions of the tube repair assembly and the composite alloy of the tube assembly are pre-selected so that the sleeve may be freely inserted into the tube when the sleeve is below the transition temperature. Upon the sleeve exceeding the transition temperature, the sleeve forms an interference seal fit with the interior tube wall to thereby provide a fluid seal in cooperation with the head of the stud.

In accordance with a second embodiment of the invention, the driver wedge 40 has diametral dimensions and a material composite which is pre-selected for receiving the sealing sleeve and freely inserting the sleeve into the tube. Upon the driver wedge exceeding the pre-established transition temperature, the diametral dimensions of the wedge increase to radially force the sealing sleeve into an interference fit relationship with the tube.

In a third embodiment of the invention, both the sealing sleeve and the driver wedge are formed of a shape memory alloy so that at a temperature below the transition temperature the assembly may be inserted into a tube to be repaired, and when the assembly exceeds the transition temperature, both the driver wedge and the sealing sleeve radially expand to provide the interference fit with the tube. The stud 20, the washer 60 and the coupling nut 62 are preferably formed of steel. In the embodiments wherein only the driver wedge or the sealing sleeve is formed of the shape memory alloy, the other member is also preferably formed of steel.

The tube repair assembly is installed by mounting the sealing sleeve on the driver wedge and threading the wedge through the threaded portion 24 of the stud so that the threads of the driver wedge disengage the threads of the stud. The Belleville washer and coupling nut are then threaded loosely against the end of the driver wedge. The assembly is sufficiently cooled so that the diametral dimensions of the sealing sleeve are less than the inside diameter of the tube. The cooled assembly is inserted into the tube and the coupling nut is tightened so that the driver wedge radially deforms the sealing sleeve while the end of the skirt of the stud head is simultaneously sealed against the end of the sealing sleeve. While the mechanically induced radial expansion of the sleeve 50 establishes a fluid tight connection between the repair assembly 12 and the tube wall, there may be relaxation of the sleeve upon removal of the driving force from nut 62. Any such relaxation is a potential source of leakage. A reliable, leak-proof interference fit of the sealing sleeve against the tube is provided by either the sealing sleeve end or the driver wedge exceeding the transition temperature and thus radially expanding to compensate for any such relaxation. It should be appreciated that the foregoing assembly functions to accommodate variations in manufacturing tolerances and tube eccentricity and to compensate for structural defects due to corrosion or erosion at the tube surface to thereby enhance the integrity of the sealing engagement with the tube wall.

In accordance with the invention, the foregoing tube repair assembly may be relatively easily removed from the tube if required even though tube distortions may otherwise prevent the release of the assembly when the assembly temperature decreases below the transition temperature. The repair assembly is removed by loosening the coupling nut 62. The threaded portion 24 of the stud is then caused to engage the internally threaded surface of the driver wedge. The latter may be facilitated by application of a suitable torque to the stud shank 26. Subsequent to engagement by the stud, the wedge may be separated from the sealing sleeve by an axial pulling force (to the right in the drawing). The continued axial displacement of the stud results in the skirt re-engaging the end of the sealing sleeve to facilitate the axial removal of the sealing sleeve.

While preferred embodiments of the foregoing invention have been described for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. An assembly for plugging a defective tube comprising:

stud means comprising a shaft having a threaded portion and a head portion, said threaded portion having a maximum diameter which exceeds the diameter of an intermediate shaft portion, said intermediate portion being disposed between said head portion and said threaded portion, said head portion defining a generally annular sealing surface;

a driver wedge, said wedge having a central axial bore which includes a threaded portion adapted for engagement with said stud means shaft threaded portion, said wedge having a generally frustoconical exterior shape, the axial bore of said wedge being configured and dimensioned so that in a first axial position said wedge is threadably engaged with said stud means shaft threaded portion and in a second axial position said wedge is disengaged from said stud means shaft threaded portion with said shaft extending through said bore, said first position being commensurate with removal of the plug assembly and said second position being commensurate with installation of the plug assembly;

a sealing sleeve, said sleeve having an interior configuration complementory to said wedge exterior shape, said sleeve defining an exterior circumferentially extending sealing surface, an end of said sleeve being adapted for sealing engagement with said stud means head portion sealing surface; and a coupling assembly threadably engagable with said stud means threaded shaft portion so that upon mounting of said sleeve in said wedge and positioning of said stude means shaft in said wedge axial bore, said coupling assembly may be forceably engaged with said wedge to cause radial expansion of said sleeve and establish transverse sealing engagement between said sleeve end and said stud means head portion defined annular sealing surface.

2. The assembly of claim 1 wherein at least one of said driver wedge and said sealing sleeve members is formed of a material having a shape memory wherein the diametral dimensions on said member will expand when the temperature of said member exceeds a transition temperature.

3. The assembly of claim 1 wherein said stud means head further defines a skirt which is generally symmetrical with respect to said stud means shaft and said annular sealing surface is defined by an end of said skirt.

4. The assembly of claim 1 wherein the annular sealing surface of said head and said end of said sleeve define a sealing groove and a complementary sealing rim.

5. The assembly of claim 1 wherein said stud means head further defines a skirt which is generally symmetrical with respect to said stud means shaft and said annular sealing surface is defined by an end of said skirt.

6. The assembly of claim 5 wherein at least one of said driver wedge and said sealing sleeve members is formed of a material having a shape memory wherein the diametral dimensions on said member will expand when the temperature of said member exceeds a transition temperature.

7. The assembly of claim 6 wherein the annular sealing surface of said head and said end of said sleeve define a sealing groove and a complementary sealing rim.

8. An assembly for plugging a defective tube comprising:
   stud means comprising a head forming a generally annular sealing surface and a shaft having an externally threaded portion, said annular sealing surface being concentric with said shaft;
   a driver wedge, said wedge defining a central axial bore at least partially defined by a threaded surface adapted for engagement with stud means shaft threaded portion, said axial bore being configured and dimensioned so that in a first axial position thereof said wedge is threadably engaged with said stud means shaft threaded portion and in a second axial position said wedge is threadably disengaged from said stud means shaft, said wedge also having an exterior wedging surface;
   a sealing sleeve interiorly dimensioned for generally concentric receptive engagement by said driver wedge and exteriorly defining a circumferentially extending sealing surface, an end of said sleeve being adapted for sealing engagement with said stud means annular sealing surface, at least one of said driver wedge and said sleeve being formed of a shape memory material, the diametral dimensions of said sleeve allowing said sleeve to be inserted into a tube to be plugged when the temperature of said sleeve is below a preestablished transition temperature and the said diametral dimensions of said sleeve expanding so that said circumferentially extending surface of said sleeve seals against said tube when the temperature of said sleeve exceeds the transition temperature; and
   a coupling assembly threadably engageable with said stud means shaft threaded portion so that upon mounting said sleeve on said driver wedge and receiving said stud means shaft in said wedge axial bore, said coupling assembly is forceably engageable with said driver wedge to deform said sealing sleeve radially and axially for transverse sealing engagement with said stud means annular sealing surface.

9. The assembly of claim 8 wherein said stud means head further forms a skirt generally symmetrical with respect to said stud means shaft and said transverse sealing surface is defined by an end of said skirt.

10. A method for installing a removable plug in a tube comprising:
   providing a plug assembly comprising a sealing sleeve and a driver wedge, said plug assembly further comprising a stud having a head with a shaft extending axially therefrom, said shaft passing through said sleeve and wedge and having a partially threaded surface, said plug assembly also comprising a coupling nut which engages said shaft threaded portion to capture said sleeve and wedge between said nut and head whereby said wedge and sleeve are concentrically mounted on said shaft, a portion of the plug assembly being formed of shape memory material so that the diametral dimensions of the sealing sleeve are reduced at a temperature below a transition temperature and are expanded at a temperature above said transition temperature;
   threadably engaging the driver wedge with the stud shaft threaded surface;
   cooling said plug assembly to a temperature below said transition temperature;
   inserting said cooled plug assembly in a tube to be plugged;
   axially tightening said coupling nut to thereby axially displace the wedge relative to the sleeve to force the stud head and sealing sleeve into generally axially sealing engagement and to deform the sealing sleeve into radial engagement with the tube wall; and
   heating said plug assemly above said transition temperature to thereby radially expand said sealing sleeve to maintain sealing engagement with the tube wall.

* * * * *

UNITED STATES PATENT AND TRADEMARK OFFICE
CERTIFICATE OF CORRECTION

PATENT NO. : 4,723,578
DATED : February 9, 1988
INVENTOR(S) : Walter J. Mordarski et al It is certified that error appears in the above-identified patent and that said Letters Patent is hereby corrected as shown below:

Column 6, line 63 of claim 1, "in" should be --on-- .

Column 6, line 64 of claim 1, "stude" should be --stud-- .

Column 8, line 51 of claim 10, "assemly" should be --assembly--

Signed and Sealed this

Sixth Day of October, 1992

Attest:

DOUGLAS B. COMER

*Attesting Officer*    Acting Commissioner of Patents and Trademarks